United States Patent

[11] 3,579,742

| [72] | Inventor | Vincent H. Muttart<br>902 Rockaway Drive, Placentia, Calif. 92670 |
|---|---|---|
| [21] | Appl. No. | 781,499 |
| [22] | Filed | Dec. 5, 1968 |
| [45] | Patented | May 25, 1971 |

[54] CLAMPING MECHANISM FOR MOLDING MACHINE
9 Claims, 5 Drawing Figs.

[52] U.S. Cl. .................................................. 18/30, 74/520
[51] Int. Cl. .................................................. B29f 1/00
[50] Field of Search .................................... 18/30 (LT), (LM), (LV), (LA), 16 (T); 74/520 (X)

[56] References Cited
UNITED STATES PATENTS

| 2,496,344 | 2/1950 | Hall | 18/30LT |
| 2,492,259 | 12/1949 | Beuscher | 18/30LT |
| 3,200,597 | 8/1965 | Stotz | 74/520 |
| 2,371,547 | 3/1945 | Rosenlund | 74/520 |

Primary Examiner—Richard J. Herbst
Assistant Examiner—A. L. Havis
Attorney—Hinderstein & Silber ABSTRACT: In a molding machine, a pair of toggle mechanisms, each of which includes a pair of toggle links connected between a moveable platen and a reciprocating piston. The toggle joint includes a roller which cooperates with a stationary, straight, angular wedge surface to impart a frictionless wedging action to the platen during movement of the toggle joint. A centering guide attached to the piston insures linear motion thereof.

INVENTOR.
VINCENT H. MUTTART
BY
ATTORNEYS

INVENTOR.
VINCENT H. MUTTART
BY
ATTORNEYS

CLAMPING MECHANISM FOR MOLDING MACHINE

BACKGROUND OF THE INVENTION

1. Field of the Invention

The present invention relates to machines for injection molding or die casting plastics and other moldable materials and, more particularly, to an improved toggle mechanism for quickly and efficiently moving and locking in place the moveable element of a molding machine and for preventing movement of such element during the molding operation.

2. Description of the Prior Art

The present invention is disclosed in relation to an injection molding machine having a stationary platen and a reciprocating, moveable platen, these platens supporting mating die or mold sections for relative motion between open and closed positions. The present clamping mechanism advances the moving platen and its die section from the open position into facial engagement with the mating die section on the stationary platen and then applies a high clamping force to hold the die sections in sealed engagement to resist the pressure which is developed within the die cavity as a result of pressure being applied to the plastic or other moldable material to cause such material to flow into the die cavity. However, it should be understood that the injection molding machine has been chosen simply to illustrate the principles of the present invention, and that the present clamping mechanism is intended for general utility in machines having a moveable element which exerts high pressure on a fixed element. For example, the fixed member may be the head of a blanking or stamping press, a laminating machine, a vice frame or any similar structure. The moveable member may be one of the platens of a press or laminating machine, the moveable jaw of a vice, or any similar member that is to be forced into contact with a workpiece.

In each of these machines, and especially in the case of an injection molding machine, the die sections must be held in the closed position under a relatively great force which is sufficient to withstand the molding pressure. In some machines, the moveable platen is operated by direct connection to a hydraulic ram. However, where this is the case, in order to insure adequate die closing pressure, the hydraulic apparatus must necessarily be made extremely large and cumbersome as well as requiring much more extensive and expensive auxiliary apparatus such as pressure pumps, supply lines and pressure fluid reservoirs.

In order to eliminate this requirement, toggle linkage mechanisms have been employed as a means for securing the relatively high pressure or force required for holding the die sections of the pressure casting machine in the closed position. Such toggle mechanisms are characterized by rapid motion with very little force during the first part of the stroke and almost infinite force with only slight movement of the die as the toggle reaches the locked position. However, it has been found that the development of heavy pressures imposes severe strains on the pivots and connecting elements of such toggle linkages, with resulting breakages of the linkage parts and wear in the pivots unless the entire mechanism is of very heavy construction. The result of only slight wear in such pivots and connecting elements may be deflection of the moveable platen during molding thus preventing flat parallel closing, which is detrimental to good molding and injurious to the dies.

In order to solve this problem, it has been proposed to use a linkage in which a wedging action is utilized to acquire the high final closing pressure. However, even where this is the case, the final closing movement generally evidences sliding motion between the wedge elements, resulting in a substantial amount of friction which resists movement of the toggle links, and a substantial amount of wear on the sliding surfaces which, as was the case with wear in the pivots and connecting elements of toggle linkages, results in an inability to retain the die sections in a fixed, closed position.

An additional problem with substantially all existing prior art toggle-type clamping mechanisms results from the fact that the mechanism usually includes at least two, symmetrically arranged, complementary sets of toggle linkages. The corresponding linkages of the plural toggle mechanisms are intended to operate simultaneously and to counterbalance each other as the moveable piston to which they are attached reciprocates. However, because of slight asymmetries in the toggle mechanisms and for other reasons, one toggle mechanism often tends to seize in a stationary position as the piston starts to move to open the die plates. The result is a deflection of the toggle links and piston rod which often results in deformation or breakage of the piston rod.

SUMMARY OF THE INVENTION

According to the present invention, these and other problems associated with prior art clamping mechanisms are solved by providing an improved toggle mechanism for quickly and efficiently moving and locking in place the moveable element of a molding machine and for preventing movement of such element during the molding operation. The present mechanism is characterized by a wedging action which is utilized to acquire the high final closing pressure. However, this wedging action is achieved in an almost frictionless manner so as to minimize the resistance to movement of the toggle links and to substantially eliminate wear thereof. Furthermore, once the toggle linkages have reached their final closed position, the full pressure on the closed die sections is absorbed by stationary abutments, thereby eliminating the severe strains on the pivots and connecting elements of typical toggle linkages. Finally, a unique centering guide prevents deflection of the moveable piston, thereby eliminating the possibility of such member being damaged.

Briefly, the present toggle mechanism comprises a pair of toggle links pivotally connected together between a moveable platen and a reciprocating piston. The toggle joint includes a roller which is adapted to roll along a straight, inclined, wedge surface towards a final closed position so as to impart a wedging action to the platen during movement of the toggle joint. In the closed position, the roller is in surface contact with an arcuate seating recess which forms, with the wedge surface, a stationary abutment. According to a first embodiment of the invention, a pair of arms having rollers at the ends thereof are attached to the free end of the piston to guide the path of the piston to prevent bending thereof. In a second embodiment, a pair of arms attached to the free end of the piston travel in grooves in a stationary support plate to perform a similar function.

It is, therefore, an object of the present invention to provide a novel clamping mechanism for a machine having a moveable element which exerts a high pressure on a fixed element, such as a molding machine.

It is a further object of the present invention to provide a clamping mechanism for a molding machine which includes a toggle linkage mechanism for locking the moveable element of such machine in place and for preventing movement of such element during the molding operation.

It is a still further object of the present invention to provide such a toggle mechanism for a molding machine in which a wedging action is utilized to acquire the high final closing pressure.

It is another object of the present invention to provide a toggle mechanism for a molding machine which incorporates a wedging action which is characterized by a lack of sliding motion and a lack of high friction between the relatively moveable wedging elements.

It is still another object of the present invention to provide a clamping mechanism for a molding machine which incorporates a centering guide to prevent deflection of the reciprocating piston.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several FIGURES and wherein:

DESCRIPTION OF THE PREFERRED EMBODIMENTS

Figures 1, 2:
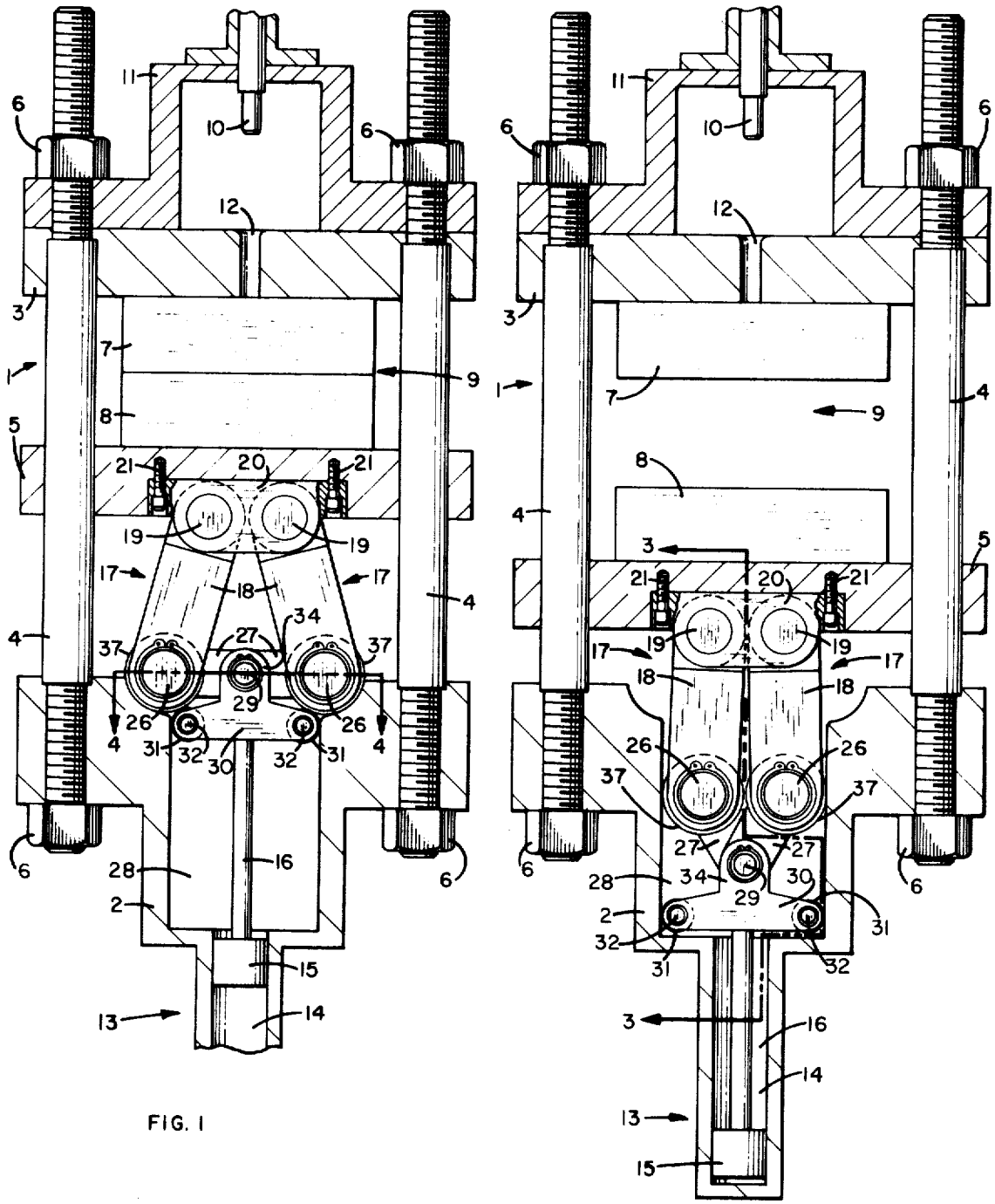
FIG. 1 is an elevation view, partly in section, of a typical molding machine showing the present clamping mechanism and centering guide with the moveable platen in the locked position.
FIG. 2 is a view identical to that of FIG. 1 but showing the moveable platen in the open position.

Referring now to the drawings, the molding machine, constituting the exemplary embodiment of the invention, comprises an upright frame 1 including a stationary base platen 2, a vertically spaced adjustable platen 3, and a plurality of vertical tie bars 4 rigidly interconnecting platens 2 and 3, and constituting guide members for a moveable platen 5. In the present instance, four quadrilaterally spaced tie bars 4 are provided and they are rigidly secured to platens 3 and 5 with suitable locking nuts 6.

Secured in any suitable manner in opposed relation to the adjacent surfaces of platens 3 and 5 are two separable sections 7 and 8 of a suitable mold 9. To provide means for forcing charges of plastic or other moldable material under heavy molding pressure into mold 9, an injection plunger 10 is supported from platen 3 by suitable means 11. Injection plunger 10 is supported in alignment with a bore 12 in platen 3 for movement therethrough in a manner well known to those skilled in the art.

A hydraulic actuator, generally designated 13, comprising a cylinder 14, a piston 15, and a piston rod 16, forms a part of stationary base platen 2, whereby piston rod 16 is adapted for vertical reciprocatory motion relative to cylinder 14 through a generally rectangular opening 28 in the center of base platen 2. Piston rod 16 is connected through two identical and complementary toggle mechanisms 17 to moveable platen 5 for reciprocating platen 5 and die section 8 toward and away from stationary platen 3 and die section 7 to close and open mold 9. When mold 9 is in the closed position, injection plunger 10 is operative to extend through hole 12 into die section 7 to plasticize and force a suitable moldable material into the mold cavity.

Figure 3:
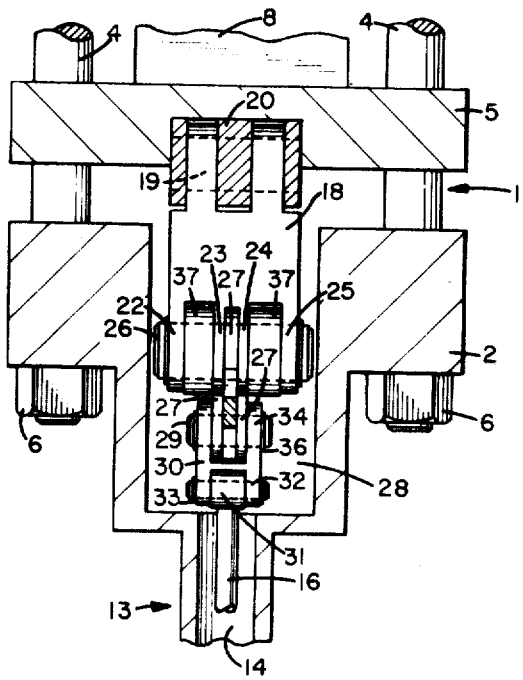
FIG. 3 is a view taken along the line 3-3 in FIG. 2.
Figure 4:
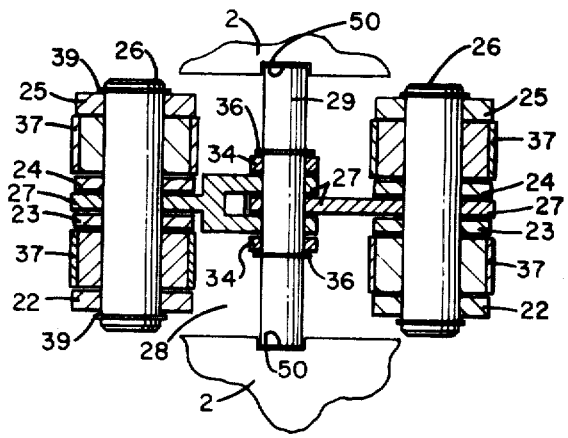
FIG. 4 is an enlarged view taken along the line 4-4 in FIG. 1 and showing a modified from of centering guide.

As shown in FIGS. 1—5, each of toggle mechanisms 17 comprises a first toggle link 18 one end of which is pivotally connected via a pivot pin 19 to a pivot block 20 which is fixedly secured to moveable platen 5 by suitable means such as screws 21. The other end of toggle link 18 comprises four extensions 22—25, thereby forming three generally U-shaped channels, therebetween. Extending into the center Y-shaped channel, between extensions 23 and 24, and pivotally connected therein via a pivot pin 26, is one end of a second toggle link 27 so as to constitute a toggle joint. As shown in FIG. 4, the other end of one of toggle links 27 is straight whereas the other end of the other toggle link 27 is formed as a clevis which surrounds the other end of the one toggle link 27, the other ends of toggle links 27 being pivotally connected via a pivot pin 29.

According to a first embodiment of the invention, and as shown in FIGS. 1—3, the free end of piston rod 16 is connected to an elongated member 30 having a U-shaped channel at opposite ends thereof in which is secured rollers 31 via pins 32 which are secured by suitable retaining collars 33. Connected intermediate the opposite ends of member 30 and in alignment with piston rod 16 is a clevis 34 which surrounds the other ends of toggle links 27. As shown most clearly in FIGS. 3 and 4, pin 29 pivotally connects clevis 34 and the other ends of toggle links 27, suitable retaining collars 36 securing pin 29.

Positioned between extensions 22 and 23 and between extension 24 and 25 at the toggle joints between links 18 and 27 are rollers 37. Pin 26, secured by suitable retaining collars 39, extends through extensions 22—25, rollers 37, and the one end of toggle links 27.

Figure 5:
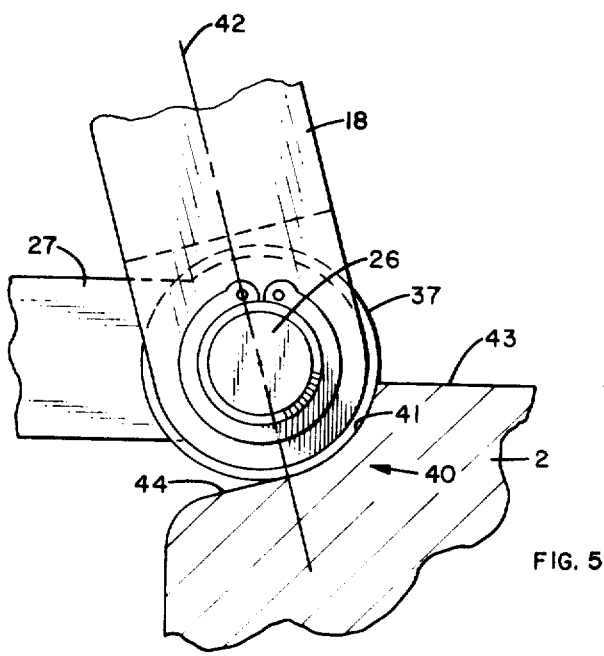
FIG. 5 is an exploded view of a portion of the clamping mechanism of FIG. 1.

Referring now to FIGS. 1, 2 and 5, opening 28 in stationary platen 2 terminates in a pair of stationary abutment surfaces 40. Abutment 40 comprises a first surface 41 which extends from axis 42 of toggle link 18 to the top surface 43 of platen 2, surface 41 constituting a curved seating recess, the radius of curvature of which is equal to the radius of curvature of rollers 37 whereby rollers 37 contact substantially all of surface 41 when in the position shown in FIG. 5. Stationary abutment 40 further comprises a straight, angular wedge surface 44 which is positioned tangent to surface 41 and perpendicular to axis 42 when toggle linkage 18 is in the position shown in FIG. 5.

In operation, the parts will be positioned as shown in FIG. 2 when the die is open. Toggle mechanisms 17 are located in balanced relation respectively at opposite sides of frame 1 with toggle links 27 extending toward each other for operative connection to piston rod 16 via member 30. Accordingly, as piston rod 16 ascends, toggle mechanisms 17 serve to advance moveable platen 5 and die section 8 toward stationary platen 3 and die section 7. This motion continues with rollers 31 and 37 rolling in a substantially frictionless manner along the inside surfaces of opening 28. The first part of the motion of piston rod 16 is characterized by rapid motion since there is very little force during the first part of the stroke tending to prevent motion of platen 5.

As die section 8 supported by moveable platen 5 comes into close proximity to die plate 7 connected to platen 3, rollers 37 reach the leading edges of surfaces 44 and rollers 37 begin to roll outwardly in response to continued motion of piston rod 16. When rollers 37 begin their motion along surface 44, there is still some clearance between die sections 7 and 8 and not a great deal of force is required to spread toggle linkages 18. However, as rollers 37 continue their motion towards seating recesses 41, a wedging action takes place thereby urging moveable platen 5 and die section 8 towards die section 7 to close and lock mold 9. Simultaneously, a correspondingly greater force is available for spreading toggle linkages 18 due to the angular change in position of toggle linkages 27. This action continues, with rollers 37 rolling along wedge surfaces 44 until die section 8 reaches the closed position. In this position, toggle linkages 27 are aligned and rollers 37 are in contact with the full extent of surfaces 41. Furthermore, platen 5 is now capable of receiving the full molding pressure, since any downward pressure on platen 5 is transmitted directly through toggle linkages 18 to stationary platen 2.

After the molding operation is complete, piston 16 begins to descend to lower moveable platen 5. However, in the absence of member 30 and rollers 31, it has been found that one of toggle mechanisms 17 may tend to seize in its seating recess so that as piston rod 16 descends, one set of rollers 37 tends to remain stationary causing pin 29 and the free end of piston rod 16 to travel in an arcuate path around pin 26. Member 30 and rollers 31 connected to the opposite ends thereof are operative to prevent this and the resultant damage to piston rod 16 by operating as a centering guide. In other words, the action of rollers 31 along the inside surfaces of rectangular opening 28 in base platen 2 insures linear motion of piston rod 16 throughout the entire length of its motion.

Referring to FIG. 4, there is shown an alternate embodiment for a centering guide. According to the embodiment of FIG. 4, member 30 and rollers 31 may be entirely eliminated by providing grooves 50 along the opposite sides of base platen 2 in opening 28 and by extending pin 29 so that it extends into grooves 50. In this manner, pin 29, which represents the uppermost part of piston rod 16, is guided along a linear path in grooves 50 thereby centering piston rod 16 at all times.

It can therefore be seen that in accordance with the present invention there is provided a clamping mechanism for quickly and efficiently moving and locking in place the moveable element of a molding machine and for preventing movement of said element during the molding operation. The present mechanism is characterized by a wedging action due to the angular inclination of surface 44 which is utilized to acquire the high final closing pressure. However, this wedging action is achieved in an almost frictionless manner by providing rollers 37 thereby minimizing the resistance to movement of toggle linkages 18 and 27 and to substantially eliminate wear of toggle mechanisms 17. Furthermore, once toggle mechanisms 17 have reached their final closed position, the full pressure on the closed die plates 7 and 8 is absorbed by base platen 2, thereby eliminating the severe strains on the pivots and connecting elements typical of prior art toggle linkages. Finally, through the action of element 30 and rollers 31 or pin 35 extending into grooves 50, deflection of piston rod 16 is prevented, thereby eliminating the possibility of such member being damaged.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In a machine for molding plastics or other moldable materials wherein a first platen moves along a fixed supporting frame between an open position and a closed position relative to a second platen under the control of a reciprocating piston rod, the improvement comprising:

a pair of first toggle links each pivotally connected at one end thereof to said first platen;

a pair of second toggle links each pivotally connected at one end thereof to one end of said piston rod, the other ends of each of said first and second toggle links being pivotally connected to each other to constitute a pair of toggle joints;

at least one roller rotatably secured at each of said toggle joints; and a pair of straight, angular wedge surfaces positioned on opposite sides of said supporting frame, said rollers adapted to contact and roll along said wedge surfaces so as to impart a wedging action to said first platen during movement of said toggle joints, said second toggle links being in alignment when said first platen has reached said closed position, each of said straight, angular wedge surfaces terminating in a curved seating recess, the radius of curvature of said curved seating recesses being equal to the radius of curvature of said rollers whereby said rollers are in surface contact with said seating recesses when said first platen has reached said closed position.

2. In a machine according to claim 1, the improvement wherein each of said wedge surfaces is positioned perpendicular to the longitudinal axis of the corresponding one of said first toggle links when said links are in said closed position.

3. In a machine for molding plastics or other moldable materials wherein a first platen moves along a fixed supporting frame between an open position and a closed position relative to a second platen under the control of a reciprocating piston rod, the improvement comprising:

a pair of first toggle links each pivotally connected at one end thereof to said first platen, the other end of each of said first toggle links comprising four extensions thereby forming three generally U-shaped channels therebetween;

a pair of second toggle links each pivotally connected at one end thereof to one end of said piston rod, the other ends of said second toggle links extending into the center U-shaped channels of said first toggle links and being pivotally connected therein to constitute a pair of toggle joints;

a roller rotatably secured in each of the remaining U-shaped channels in said first toggle links at each of said toggle joints; and a pair of straight, angular wedge surfaces positioned on opposite sides of said supporting frame, said rollers adapted to contact and roll along said wedge surfaces so as to impart a wedging action to said first platen during movement of said toggle joints, said second toggle links being in alignment when said first platen has reached said closed position.

4. In a machine according to claim 3 the improvement comprising:

a pin extending through said extensions, said other end of said second toggle link and said rollers to pivotally connect said elements.

5. In a machine for molding plastics or other moldable materials wherein a first platen moves along a fixed supporting frame between an open position and a closed position relative to a second platen under the control of a reciprocating piston rod, the improvement comprising:

a pair of first toggle links each pivotally connected at one end thereof to said first platen;

a pair of second toggle links each pivotally connected at one end thereof to one end of said piston rod, the other ends of each of said first and second toggle links being pivotally connected to each other to constitute a pair of toggle joints;

at least one roller rotatably secured at each of said toggle joints;

a pair of straight, angular wedge surfaces positioned on opposite sides of said supporting frame, said rollers adapted to contact and roll along said wedge surfaces so as to impart a wedging action to said first platen during movement of said toggle joints, said second toggle links being in alignment when said first platen has reached said closed position; and means for guiding said one end of said piston rod along a substantially linear path to prevent bending thereof, said piston-rod-guiding means comprising:

a pair of arms rigidly connected at one ends thereof to said one end of said piston rod; and at least one roller rotatably secured to the other end of each of said arms, said rollers adapted to roll along opposite sides of said fixed supporting frame.

6. In a machine according to claim 5, the improvement wherein said arms extend in a direction parallel to the plane of motion of said toggle joints.

7. In a machine for molding plastics or other moldable materials wherein a first platen moves along a fixed supporting frame between an open position and a closed position relative to a second platen under the control of a reciprocating piston rod, the improvement comprising:

a pair of first toggle links each pivotally connected at one end thereof to said first platen;

a pair of second toggle links each pivotally connected at one end thereof to one end of said piston rod, the other ends of each of said first and second toggle links being pivotally connected to each other to constitute a pair of toggle joints;

at least one roller rotatably secured at each of said toggle joints;

a pair of straight, angular wedge surfaces positioned on opposite sides of said supporting frame, said rollers adapted to contact and roll along said wedge surfaces so as to impart a wedging action to said first platen during movement of said toggle joints, said second toggle links being in alignment when said first platen has reached said closed position; and means for guiding said one end of said piston rod along a substantially linear path to prevent bending thereof, said piston-rod-guiding means comprising:

a pair of arms rigidly connected at one ends thereof to said one end of said piston rod; and a pair of vertically disposed grooves in opposite sides of said fixed supporting frame, said arms extending into said grooves whereby the path of said piston rod is guided by said grooves.

8. In a machine according to claim 7, the improvement wherein said arms extend in a direction which is perpendicular to the plane of motion of said toggle joints.

9. In a machine for molding plastics or other moldable materials wherein a first platen moves along a fixed supporting frame between an open position and a closed position relative to a second platen under the control of a reciprocating piston rod, the improvement comprising:

a pair of first toggle links each pivotally connected at one end thereof to said first platen;

a pair of second toggle links each pivotally connected at one end thereof to one end of said piston rod, the other ends of each of said first and second toggle links being pivotally connected to each other to constitute a pair of toggle joints;

at least one roller rotatably secured at each of said toggle joints;

a pair of straight, angular wedge surfaces positioned on opposite sides of said supporting frame, said rollers adapted to contact and roll along said wedge surfaces so as to impart a wedging action to said first platen during movement of said toggle joints, said second toggle links being in alignment when said first platen has reached said closed position; and means for guiding said one end of said piston rod along a substantially linear path to prevent bending thereof, said piston-rod-guiding means comprising:

a pin extending through said one ends of said second toggle links and said one end of said piston rod; and a pair of vertically disposed grooves in opposite sides of said supporting frame, the opposite ends of said pin extending into said grooves whereby the path of said piston rod is guided by said grooves.